(12) United States Patent
Heirich

(10) Patent No.: US 6,359,618 B1
(45) Date of Patent: Mar. 19, 2002

(54) USING IRRADIANCE TEXTURES FOR PHOTOREALISTIC IMAGE GENERATION

(75) Inventor: Alan Heirich, Half Moon Bay, CA (US)

(73) Assignee: Compaq Computer Corporation, Houston, TX (US)

(*) Notice: Subject to any disclaimer, the term of this patent is extended or adjusted under 35 U.S.C. 154(b) by 0 days.

(21) Appl. No.: 09/264,369

(22) Filed: Mar. 8, 1999

(51) Int. Cl.[7] .............................................. G06F 15/00
(52) U.S. Cl. ..................................................... 345/426
(58) Field of Search ................................. 345/426, 427, 345/428, 589, 606, 705, 706

(56) References Cited

U.S. PATENT DOCUMENTS 6,222,937 B1 * 4/2001 Cohen et al. ................ 382/154
6,292,194 B1 * 9/2001 Powell, III .................. 345/430

* cited by examiner

Primary Examiner—Phu K. Nguyen
(74) Attorney, Agent, or Firm—Leah Sherry; Oppenheimer Wolff & Donnelly

(57) ABSTRACT

An image generator computes a set of light sample points, wherein each light sample point is a point on a light source from a geometric model, and an irradiance image is computed for each light sample point, wherein an irradiance image is a view-dependent image taken with the light sample point being the view point and the light source for the irradiance image. From the irradiance images, the image generator creates an irradiance texture for each object in a set of objects being considered the scene and the image generator renders the image of the objects in the set of objects with each object's coloring determined, at least in part, from the object's irradiance texture. Depending on performance requirements, one or more operation of the image generator is parallelized.

8 Claims, 7 Drawing Sheets

USING IRRADIANCE TEXTURES FOR PHOTOREALISTIC IMAGE GENERATION

CROSS-REFERENCE TO RELATED APPLICATIONS

U.S. patent application Ser. No. 09/264,347, filed Mar. 8, 1999 (entitled "Parallel Pipelined Merge Engines"; describes apparatus and methods that could be used to implement some of the methods described herein. That application (hereinafter "Heirich") is incorporated herein by reference for all purposes.

BACKGROUND OF THE INVENTION

The present invention relates to image generation in general and in particular to methods and apparatus for quickly generating photo-realistic images.

Rendering is the process of computing a two-dimensional viewpoint dependent image of a three-dimensional geometric model. The geometric model specifies the position, shape and color of objects and light sources in a world space. The geometric model might also specify textures for objects, where a texture is a surface coloring. Textures are used, for example, to apply wood grain to a rectangular prism or to map a video image onto the surface of a sphere.

One approach to rendering is a two-stage approach, comprising a geometry stage and a rendering stage. In the geometry stage, a database of geometric descriptions of objects and light sources (the geometric model) is transformed from a world coordinate system ("object space") into a view-dependent coordinate system ("screen space"), taking into account a view point and a view surface. The view point is a point in the object space from where the objects are being viewed (if the objects and the object space actually existed) to obtain the image. The view surface is the surface in the world space that corresponds to the screen space.

In the rendering stage, once the positions of the objects in screen space are determined, each pixel is "colored", i.e., assigned a color value from an available palette, by determining which objects are visible from the view point within the bounds of the view surface and then determining the color of the light that is emitted or reflected from the visible objects in the direction of the view point.

A typical world space is a three-dimensional (3D) coordinate space where position is measured by floating point numbers, whereas a typical screen space is a 2D array having discrete positions defined by pixel locations. For example, objects might be specified by 32-bit values for positions in the world space and be mapped to a screen space defined by a 640 by 480 pixel array, with the pixel color value for each pixel being a 24-bit, or more, value. A typical photorealistic image might require a resolution of 2000 pixels by 1000 pixels and contain a million or more separately specified scene elements (i.e., objects or light sources). While days might be available for rendering some images, many applications require real-time rendering, which generally requires specialized hardware (software image generation is usually not fast enough) and may even require that the hardware perform parallel processing.

The process of rendering to generate an image from a geometric model and a view point/surface using hardware is highly developed and many hardware graphics accelerators (HGA's) are available that can quickly render objects into images, using the above-described two-stage process or other processes. Such products often support standard command sets, such as the OpenGL API (application programming interface), a low-level programming interface that is closely related to the architecture of the HGA. This standardization makes those products convenient for development of rendering engines. Another command set that is becoming a standard is the Direct3D API developed by Microsoft Corporation. Direct3D is a higher level programming interface that has been used on computers primarily for games.

Inexpensive rendering cards for personal computers are able to render about one million triangles per second, but are typically limited to less complex geometric models. For example, many HGA's that are controlled through an OpenGL API only account for direct lighting and do not account for multiple reflections and shadows (occlusion). Consequently, designers of photorealistic image generation systems have had to forgo the use of commodity hardware and were limited to expensive, high-performance rendering engines.

SUMMARY OF THE INVENTION

The present invention overcomes several disadvantages of the prior art methods and apparatus for generating images. In one embodiment of an image generator according to the present invention, a set of light sample points is computed, wherein each light sample point is a point on a light source from a geometric model, and an irradiance image is computed for each light sample point, wherein an irradiance image is a view-dependent image taken with the light sample point being the view point and the light source for the irradiance image. From the irradiance images, the image generator creates an irradiance texture for each object in a set of objects being considered the scene and the image generator renders the image of the objects in the set of objects with each object's coloring determined, at least in part, from the object's irradiance texture. Depending on performance requirements, one or more operation of the image generator is parallelized.

A further understanding of the nature and advantages of the inventions herein may be realized by reference to the remaining portions of the specification and the attached drawings.

BRIEF DESCRIPTION OF THE DRAWINGS

FIG. 4 including

FIG. 7 including

DESCRIPTION OF THE PREFERRED EMBODIMENTS

Figure 1:
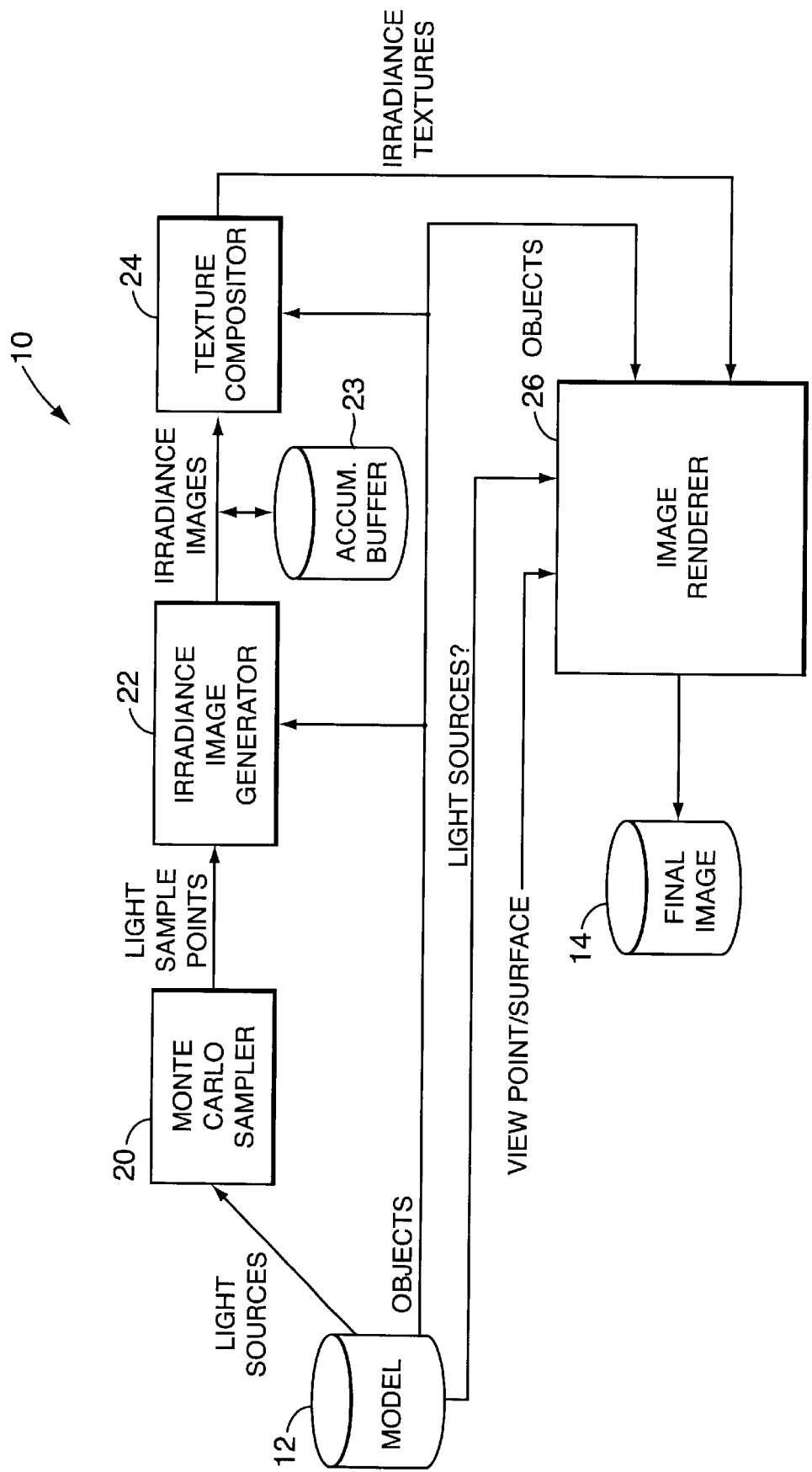
FIG. 1 is a block diagram of an image generator according to one embodiment of the present invention.

The present invention has many applications, as will be apparent after reading this disclosure. In describing an embodiment of an image generator according to the present invention, only a few of the possible variations are described. Other applications and variations will be apparent to one of ordinary skill in the art, so the invention should not be construed as narrowly as the examples, but rather in accordance with the appended claims.

FIG. 1 is a block diagram of an image generator 10 for processing a model 12 and generating an image 14 from model 12. Here, model 12 is assumed to include one or more light sources, one or more objects illuminated by those light sources and an indication of a view point and a view surface. In some embodiments, the view point and the view surface are separate from the model.

Image generator 10 also includes a sampler 20, a generator 22 for generating irradiance images, a texture compositor 24 and an image renderer 26. Sampler 20 receives descriptions of the light sources from model 12 and generates a set of light sample points that, in effect, sample the light sources. The number of samples is variable and can be set based on amount of processing time available and the desired quality of the final image 14. Generator 22 receives the set of light sample points from sample 20 and provides one irradiance image per light sample point to texture compositor 24. Texture compositor 24 combines, for each object in the view point for image 14, the contributions from each irradiance image containing that object, to form an irradiance texture for each object being processed. Not all objects in model 12 need to be fully processed, as some objects might be invisible from all of the light sample points or might be outside the view for image 14.

One implementation of image generator 10 implements all the operations that are not computation intensive or time-critical, such as the selection of the light sample points, in software, running serially on one computer or in a parallel processor, and uses hardware circuits to perform those operations that would be much faster in hardware. Where a step is a potential bottleneck and is amenable to parallelization, the step might be parallelized. For example, one specific embodiment has sampler 20 implemented in software, generator 22 implemented in part in software and part in parallel hardware, texture compositor 24 implemented in either software or hardware and image renderer 26 implemented in hardware. For the reasons explained herein, generator 22 and image renderer 26 could be easily implemented using commodity hardware graphics accelerators ("HGA's").

The software portion of generator 22 routes objects and light sample points to an array of HGA's so that each HGA receives a light sample point at a view point input to the HGA and receives the object descriptions it needs to generated an irradiance image. A given HGA will likely not have a physical input dedicated to view points, but it should be understood that an equivalent to a dedicated input for view points is a API call with which a value can be passed to the HGA with an indication that the passed value is to be used by the HGA as the view point for an image rendering. As should be apparent from this description, the generation of each irradiance image is independent of the other irradiance images, so that step can be done in parallel quite simply.

Figure 2:
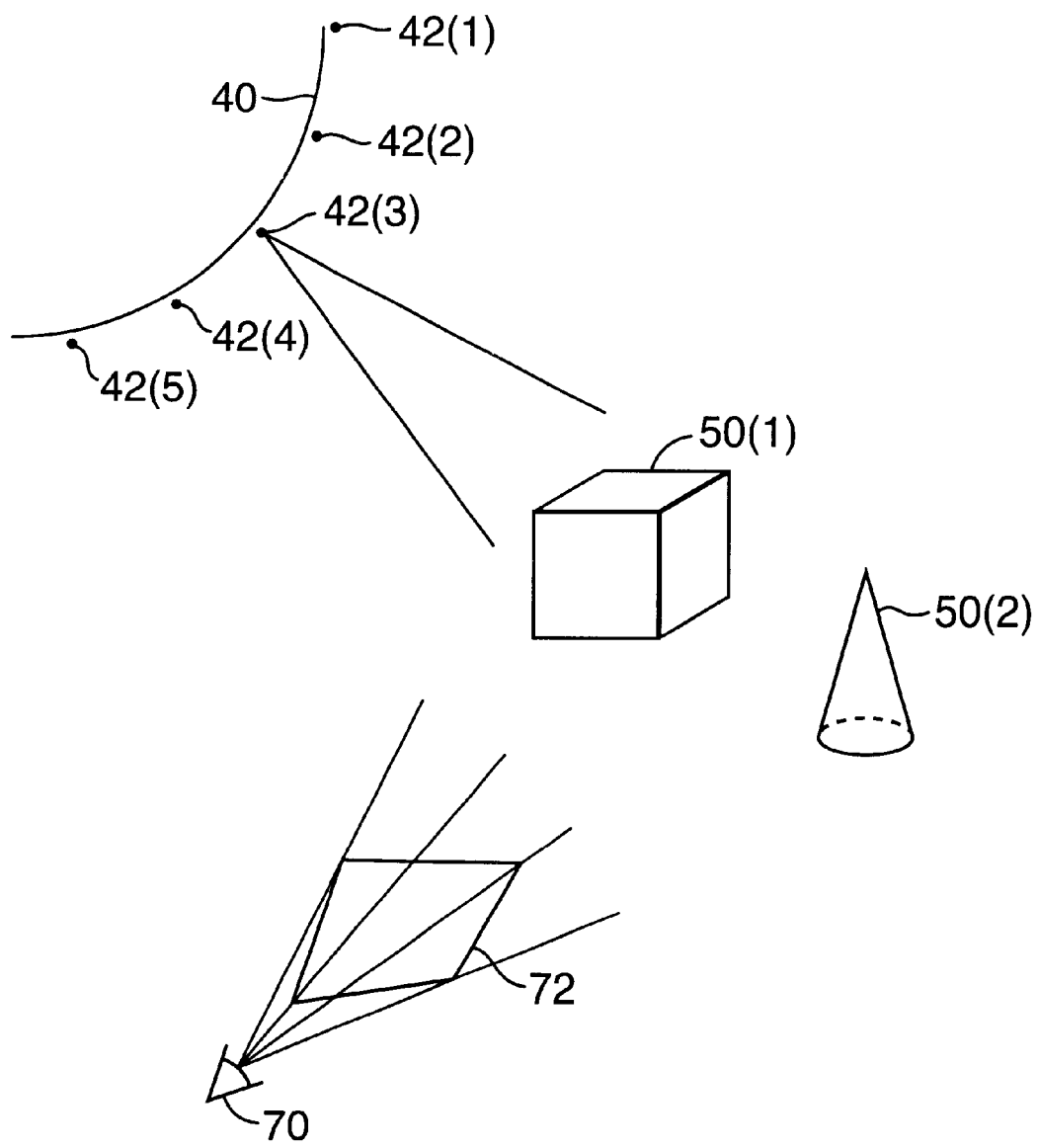
FIG. 2 is an illustration of an object space and a geometric model to be rendered.

FIG. 2 illustrates the process of determining an irradiance image. That FIG. shows a model of an object space, which includes a light source 40 (with several light sample points 42 on light source 40 indicated), objects 50, a view point 70 and a view surface 72. Normally, the view of the object space is rendered from view point 70 through view surface 72. This can be done quickly by providing an HGA with the descriptions of light source 40 and the objects 50(1), 50(2) and then specifying that the view point for the rendering is view point 70 and the view surface for the rendering is view surface 72. In generating an irradiance image using an HGA, however, a light sample point 42 is specified to be the view point. The view surface can be specified to be a large window that includes all of the objects, or just the objects that are illuminated from light sample point 42.

Figure 3:
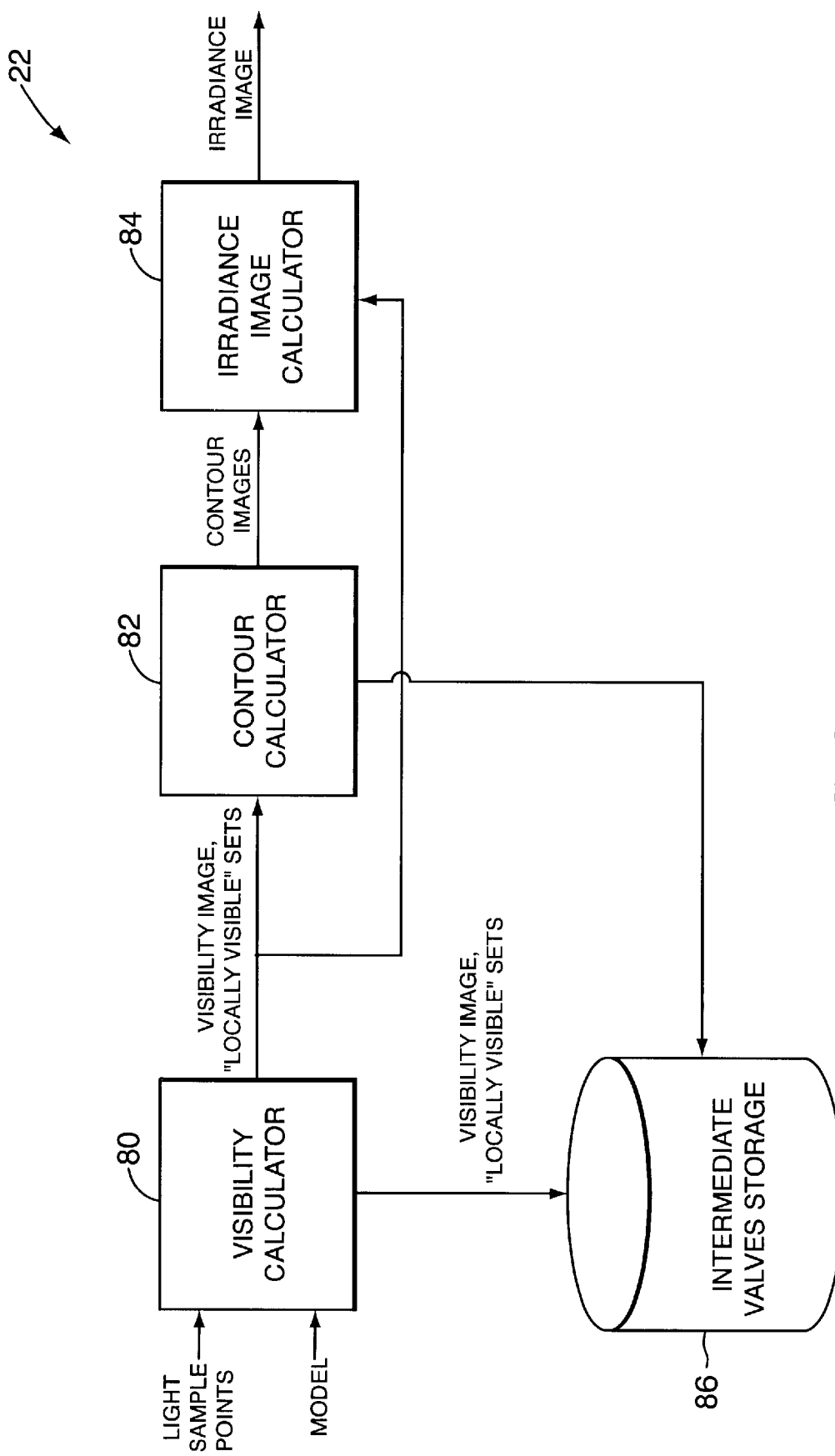
FIG. 3 is a block diagram of the irradiance image generator of FIG. 1 shown in greater detail.

The HGA might be one component of an irradiance image calculator that is part of an irradiance image generator, such as irradiance image generator 22 (FIG. 1). The components of irradiance image generator 22 are shown in FIG. 3, and include a visibility calculator 80, a contour calculator 82 and an irradiance image calculator 84.

Visibility calculator 80 has inputs to receive light sample points and the model and outputs a visibility image and a locally visible set (defined herein) for the model and a light sample point. The outputs of visibility calculator 80 can be stored in intermediate values storage 86, if those results are to be repeatedly used.

Contour calculator 82 inputs the outputs of visibility calculator 80 and outputs contour images corresponding to the visibility images and locally visible sets provided at its input. As with visibility calculator 80, outputs of contour calculator 82 can be stored in intermediate values storage 86, if those results are to be repeatedly used.

Irradiance image calculator 84 uses visibility images, locally visible sets and contour images to generate an irradiance image, as described below.

The OpenGL API for real-time graphics hardware uses a lighting model that takes into account the angles of emission for light sources and the angles of reflection for reflected light off of diffuse scattering surfaces, but that lighting model accounts only for direct lighting, in which light is reflected a single time between the light source and the camera, and does not include the effect of occlusion, where objects cast shadows on each other. However, as described herein, hardware with nothing more than the OpenGL API can be used to approximate at least the most important cases of purely diffuse and purely specular reflection, to create shadows with realistic soft edges and to correctly model the intensity of emission at the light sources. This is done by creating a single image from multiple rendering operations using light source points as view points and by making extensive use of texture mapping hardware. It should be possible to parallelize most stages of this process, to render images in an arbitrarily short amount of time by exploiting scalable hardware.

Figure 4A:
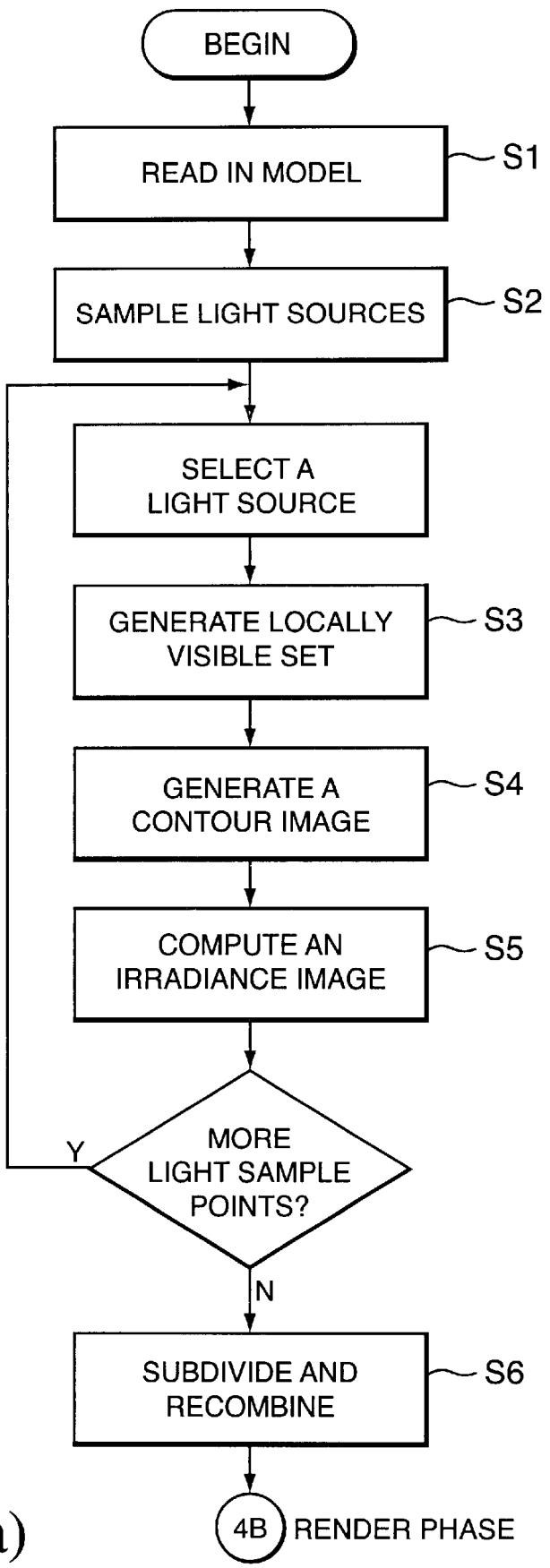
FIGS. 4(a)–4(b) is a flowchart of an image generation process according to one embodiment of the present invention.
Figure 4B:
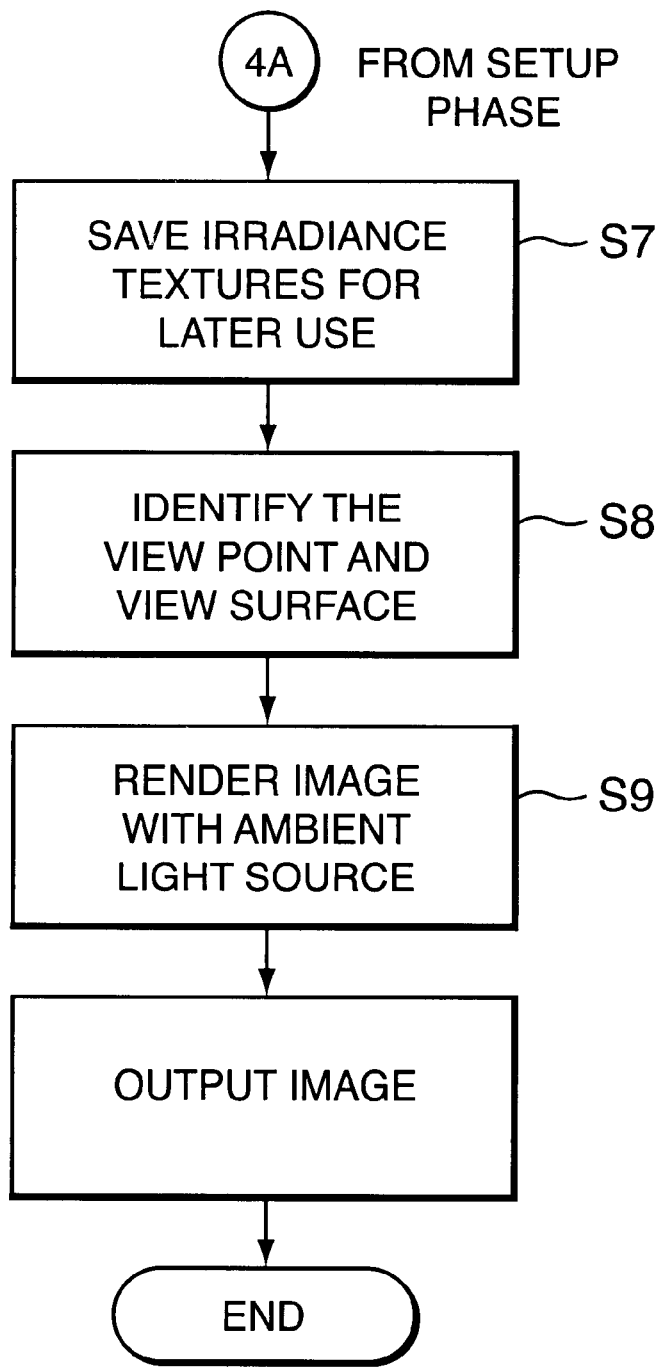

FIG. 4 is a flowchart of one such process for computing photorealistic direct lighting using the OpenGL API (or a similar interface) with an HGA, to generate possibly real-time images. A serial process is described first, followed by an explanation of how it could be parallelized. In the text below, references in parentheses refer to steps called out in FIG. 4.

The process shown in FIG. 4 can be performed using the hardware shown in FIG. 1 and other FIGS. of this application, or can be performed with entirely different apparatus. The steps of the process of generating an image from a geometric model can be divided into two phases: a setup phase and a render phase. In the setup phase, irradiance textures are prepared for all of the objects in the model. Of course, if there are objects that cannot be seen from any view point of interest, or are not illuminated by any light source, irradiance textures do not need to be prepared for those objects. In the rendering phase, the irradiance textures are used to render a final image using texture mapping, by assigning the coordinates of the object surfaces to coordinates of the irradiance texture.

Although the render phase may potentially use a large number of textures, the setup phase is typically more compute-intensive than the render phase. While the setup phase is more compute-intensive, the rendering phase is the more critical phase, since the rendering phase is usually performed much more often than the setup phase. This is because the setup phase is only necessary when the geometry or lighting changes, but the rendering phase might be needed multiple times for one setup, for example, to generate a series of images of the same objects in the same light, but from different viewpoints.

In the setup phase, an image generator computes a set of "irradiance textures" that represent a view-independent representation of the direct irradiance (incident light energy) on the objects in the model. The image generator begins the setup phase by reading in the geometric model for the image (step S1), which includes a specification of where the lighting sources are in the object space. The light sources can be either point sources or light surfaces, where light is emitted over a surface with nonzero area.

The light sources are sampled (S2), resulting in a set of light sample points. The light sources can be sampled using Monte Carlo sampling or any other suitable sampling method. For point sources, the set would typically include the location of the point source as one of the light sample points. The set also includes a sampling of points distributed over the light surfaces. The number of sample points in the set is determined by a trade off between speedy processing (fewer samples) versus more accurate images (more samples).

For each light sample point, the image generator calculates a locally visible set of objects visible from the light sample point (S3), generates a contour image from the model using the locally visible set (S4) and generates an irradiance image for the locally visible set using the information in the contour image and the model (S5). For some images, requiring high levels of detail for small objects or complex scenes, multiple irradiance images may be required for some light samples. Since these three steps are largely independent for each light sample, the workload can be easily distributed among multiple stages of a parallel processor. These three steps can also be performed using commodity HGA's, such as OpenGL-based HGA's, by setting the HGA's up for the process. For example, commodity HGA's can be made to compute a correct solution of the radiometric integral (See Equ. 1 below) that defines directly emitted irradiance (incident light energy), by setting certain terms in the OpenGL "lighting equation". A commodity HGA can compute a discretized solution to the integral by setting the k term (the spotlight angle) and the diffuse properties appropriately, and by viewing from the surface of the light and in the direction of the surface normal vector. Under these conditions, the OpenGL lighting equation (as defined, for example, in Woo, Neider and Davis, "OpenGL Programming Guide") is used to compute the radiometric integral.

To quickly generate the locally visible set for a light sample point using a standard commodity HGA, the HGA is supplied with the model and configured to calculate an image of that model without lighting, possibly using color-index mode, and a view point equal to the light sample point. The HGA will return a "visibility image" containing the objects that are visible from that light sample point, and only those objects. Other methods could be used to generate the locally visible set, but this approach uses a standard HGA.

By coloring each object uniformly and uniquely, the color of any pixel in the visibility image will indicate which object is visible from that pixel. With that visibility image, the image generator just sorts the pixels by color value, get rid of duplicates and map the color values back to their associated objects to quickly arrive at the locally visible set for the light sample point. In large architectural models, this locally visible set may be a very small fraction of the size of the geometric model, and thus culling the model to this locally visible set provides significant time savings in later stages.

The coloring to determine the locally visible set might not be needed. If the HGA supports the OpenGL feedback commands, the image generator can query the HGA for a list of the objects that are visible from a given view point. If that approach were used, the visibility image would not need to be colored and might not even need to be actually generated to arrive at the locally visible set. The visibility image is usually needed for initial identification of the pixels on the contour image, but would not be needed if the contour pixels (as described below) can be derived from the contour image.

Figure 5:
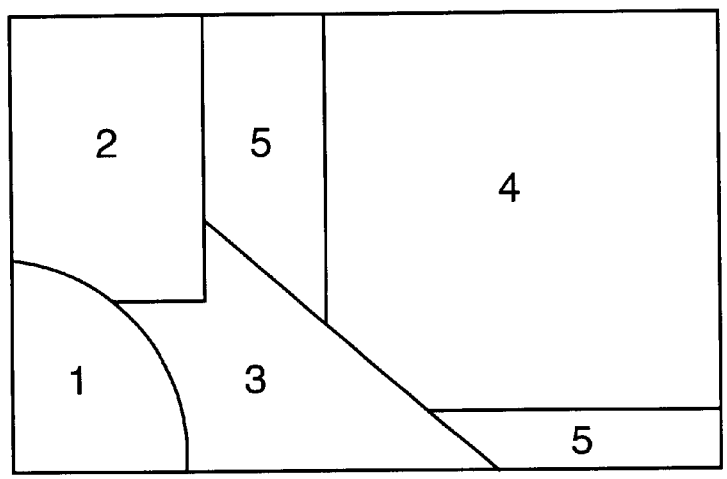
FIG. 5 is a diagram illustrating a visibility image.

FIG. 5 shows an example of a visibility image. In that visibility image, only five pixel colors (numbered 1-5) are used, implying that only five objects are visible from the light sample point associated with that visibility image. Since each object provided to the HGA that generated the visibility image has a unique color, the identities of the five visible objects can be easily determined. Note that two regions of FIG. 5 are labeled with pixel color value 5—these are disjointly visible portions of the same object, an object that is partially obscured by other objects (e.g., objects 3 and 4).

Figure 6:
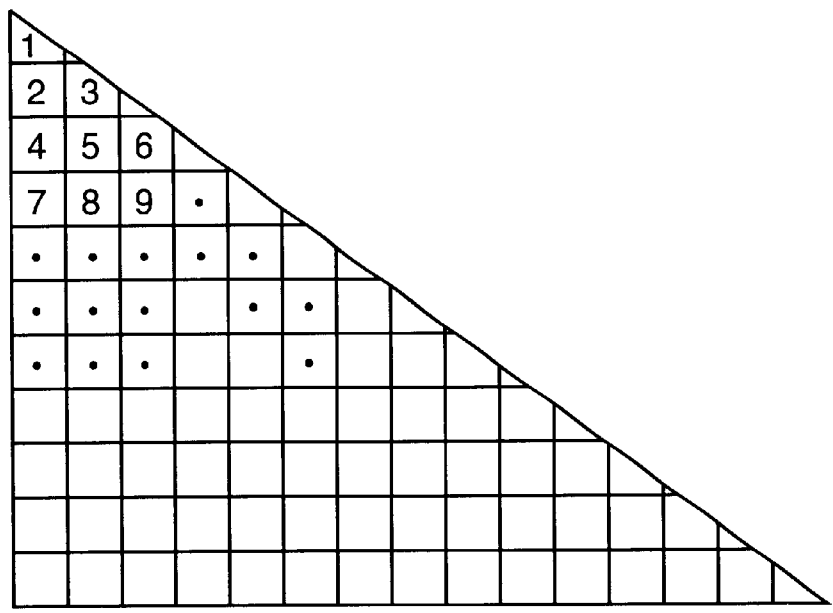
FIG. 6 is a diagram illustrating a contour image.

The image generator then generates a contour image. From the visibility image previously generated, the image generator identifies the visibility contours of objects by noting the contours between constant color regions in the visibility image. A contour image is an image wherein each object is textured with a registration texture that makes it possible to identify (within some precision) the coordinates on the object surface that correspond to specific visible pixels. A registration texture is a texture where the texture color of a given point on the object unambiguously identifies the surface coordinate of that point. An example is shown in FIG. 6, where the texture applied to a triangle is a grid with each square in the grid having a unique color (shown in the FIG. as a pixel color numbers in the grid squares). The fineness of the grid is determined by the desired resolution, but with 24-bit colors, the grid can comprise up to about 16 million grid squares without any special handling.

A registration texture is applied to each object in a way that the surface location of any given grid square is easily determined, and the contour image is then rendered. The image generator can then examine the contour image to find the pixel color values of each pixel on the contour image. Because the relationship between pixel color value and object surface coordinates is known, the image generator is able to determine the visible objects' surface coordinates that correspond with the pixels in the contour image.

Once the visibility and contour images have been generated, the image generator then generates an irradiance image (S5) by rendering the locally visible set with appropriate settings of the OpenGL lighting equation as described below in reference to Equ. 1. The resulting image represents the intensity of incident light energy (irradiance) arriving at a point on a diffuse surface as defined in the lighting equation (Equ. 1) set forth below.

In the next step (S6), these three images (visibility, contour and irradiance) are used to compute irradiance patches for every visible object from a single light source. For every pixel in the visibility image, the corresponding object is identified by its color. A visibility contour is computed for the pixel that comprises all like-colored pixels in the visibility image. This visibility contour corresponds to a portion of the object surface that is visible to the light. The corresponding pixels in the contour image identify the surface coordinate locations of the visible portions of the object surface. An "irradiance patch" is then constructed by copying pixel values from the irradiance image and assigning them to surface locations of the visible object as identified by the pixel values of the contour and visibility images. An individual surface patch is represented by a new texture that contains pixels from the irradiance image, and transparent pixels. The coordinates of the non-transparent pixels are taken from the contour image.

This process is repeated for all pixels for each light source, resulting in a set of irradiance patches (textures) for each light source. There might be one or more irradiance patches for each object, since an object might have more than one visible contiguous subsurface.

After a set of irradiance patches is generated for each light source, the irradiance patches are merged together to form a single texture for each object. An irradiance texture for an object is the sum of the values of all of the patches generated for that object. These textures for each object are used, as explained below, in a step of interactively rendering a view of the objects.

To improve performance, it might be useful to combine textures to reduce the number of textures that are loaded during rendering. Also, it should be apparent from this description that, if these irradiance patches were retained, recomputation of new textures would be simplified if individual lights change their characteristics but none of the objects are moved.

With a clever selection of pixel colors (such as making the grid square colors unique over all objects), one image can serve as the both the visibility image and the contour image, thus saving a step. This is possible since the visible objects, contours and surface coordinates are all "encoded" in the pixel colors in that one image.

In order to compute an image of energy emitted from the light and reflected back to the light, we render the set of visible objects, from the viewpoint of the light, and with all other lights turned off. By properly manipulating the modes and parameters of the OpenGL "lighting equation" it is possible to accurately compute, within the limits of the graphics accelerator, the following expression that describes the incident light at point x as contributed by the current light source:

$$\Phi(x) = \Sigma k(x, \omega, \omega') \cos \theta \alpha / \|x'-x\| e(x') \cos \xi dA \quad [\text{Equ. 1}]$$

Figure 7A:
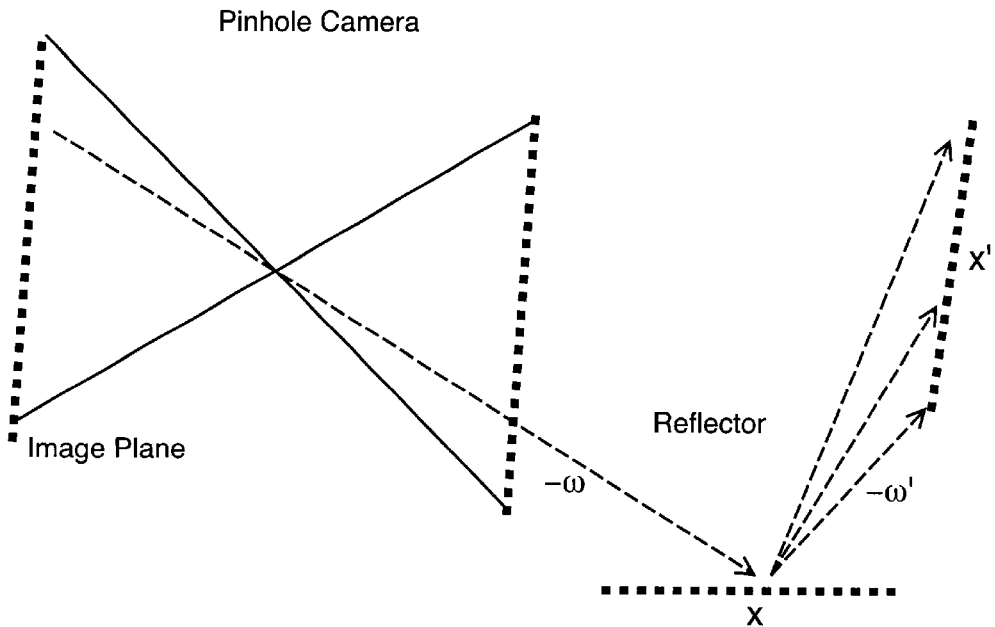
FIGS. 7(a)–7(b) is a diagram illustrating the process of estimating incident light.
Figure 7B:
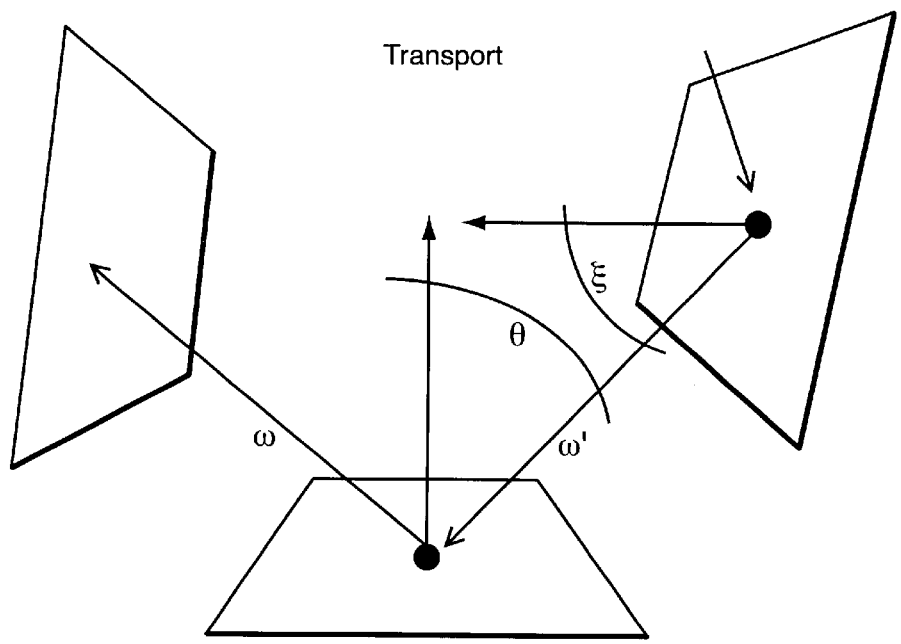

The above equation is shown geometrically in FIG. 7. The point x is a reflector and x' is on the surface of a light source (it is a light sample point). The light source emits light of intensity e that is the same at any point on the surface of the light. This intensity has a directional dependence that is modeled by the term $\cos \xi$ where $\xi$ is the difference between the angle of emission and the surface normal at x'. dA is the differential area of a surface patch on the face of the light, and is computed as the area of the face divided by the number of samples. The term $\alpha/\|x'-x\|$ represents attenuation over distance as a result of decreasing subtended solid angle. k is a "bidirectional reflectance distribution function" that describes the reflectivity of the surface at x as a function of incoming and outgoing angles. OpenGL makes it possible to model specific cases of k for surfaces that are purely diffuse, in which case $k=1/\pi$, and purely specular, where $k=1$.

Preferably, after the visibility, contour and irradiance images are generated for each light sample point, the images are saved, as needed, for the irradiance texturing step (and possibly some rendering steps) rather than having to recalculate them. Additionally, if those images are saved, steps S2 through S5 do not need to be repeated for each movement of the actual view point, since the calculation of those three images was view point independent. Those images might need to be recalculated, however, after the objects move or the lighting changes. Preferably, the image data is maintained in such a way as to minimize the amount of recomputation required when lighting properties change. For example, if the light position does not change, but the color or intensity changes, then the locally visible set and the contour image should not change and need not be recalculated. By retaining some of the intermediate results of the computations described above, the image generator can easily recompute the set of irradiance textures when the parameters of one or more lights changes, simply by regenerating the three images (visibility, contour, irradiance) images for lights that have changed and recomputing the irradiance textures.

The rendering phase will now be described. In the rendering phase, the image generator uses the irradiance textures, the model and the view point (the actual view point of the image to be generated) to render a photorealistic image. Because of the preparation performed in the setup phase, photorealistic images can be generated, in real-time if necessary, quickly with commodity HGA's (although more specialized hardware can be used as well).

Just prior to rendering, the image generator optionally discards all of the objects that were not present in at least one locally visible set during the setup phase, in order to speed up the rendering process. To render the final image, the light sources used in the setup phase are eliminated and the final image is rendered with only a single ambient light source used to illuminate the textured image. The surface colors of the objects are defined by their irradiance textures produced in the setup phase, which account for the actual light sources in the image.

With only ambient lighting and deletion of nonvisible objects, an HGA can operate at top speed with little computation needed for lighting or shading. Since most of the work is in texture mapping, the performance of the rendering phase is heavily dependent on the performance of the texture mapping hardware in the HGA's, so an HGA with quick texture mapping should be selected for this process.

The image generator shown in FIG. 1 is a serial processor, but several elements of that image generator can be parallelized. For example, multiple instances of generator 22 could be used to provide the irradiance images in parallel, with each instance dealing with one (or a few) light sample points. If more processors are available than there are light sample points, a more scalable solution might be to parallelize the computation of a single texture map across multiple processors. As for the render phase, which might be performed by image renderer 26, this phase can be parallelized using a structure such as the parallel renderer described in Heirich (cited at the start of this specification).

Although this method has been described for use with the OpenGL application programming interface for commodity hardware accelerators, it is not restricted to OpenGL and can be used with any graphics API that supports textures and a radiometrically realistic lighting equation. This includes the Direct3D API from Microsoft, as well as others.

The above description is illustrative and not restrictive. Many variations of the invention will become apparent to those of skill in the art upon review of this disclosure. The scope of the invention should, therefore, be determined not with reference to the above description, but instead should be determined with reference to the appended claims along with their fall scope of equivalents.

What is claimed is:

1. A method of generating an image, wherein an image is a representation of a view of a geometric model from a view point, comprising the steps of:
  computing a set of light sample points, wherein each light sample point is a point on a light source from the geometric model;
  computing an irradiance image for each light sample point, wherein an irradiance image is a view-dependent image taken with the light sample point being the view point and the light source for the irradiance image;
  using the irradiance images to create an irradiance texture for each object in a set of objects being considered the scene; and
  rendering the image of the objects in the set of objects with each object's coloring determined, at least in part, from the object's irradiance texture.

2. The method of claim 1, wherein the objects being considered are the objects in the scene.

3. The method of claim 1, wherein the objects being considered are the objects illuminated from at least one light sample point.

4. The method of claim 1, wherein the step of computing an irradiance image for each light sample point is performed by a plurality of hardware graphics accelerators operating in parallel.

5. The method of claim 1, wherein the step of computing an irradiance image for each light sample point is performed by at least one hardware graphics accelerator with a limited set of available commands, the limited set of available commands not including an occlusion operation.

6. The method of claim 1, further comprising a step of selecting the light sample points using a Monte Carlo selection process.

7. A method of generating an image, wherein an image is a representation of a view of a geometric model from a view point, comprising the steps of:
  selecting a set of light sample points using a Monte Carlo selection method, wherein each light sample point is a point on a light source from the geometric model;
  assigning a unique color to each object in the geometric model;
  for each light sample point, performing the steps of:
    a) initializing a hardware graphics accelerator with a view point equal to the light sample point;
    b) using the hardware graphics accelerator, determining a visibility of each object from the light sample point, the objects visible from the light sample point being the locally visible set for that light sample point;
    c) identifying contours of the visibility from the light sample point of each object in the locally visible set; and
    d) generating an irradiance image for each object in the locally visible set, wherein an irradiance image corresponds to a lit view of the geometric model from the light sampling point;
  generating an irradiance texture for each object that is in at least one light sample point's locally visible set; and
  rendering the image of the objects in the set of objects with each object's coloring determined, at least in part, from the object's irradiance texture.

8. A method of generating an image, wherein an image is a representation of a view of a geometric model from a view point, comprising the steps of:
  selecting a set of light sample points using a Monte Carlo selection method, wherein each light sample point is a point on a light source from the geometric model;
  for each light sample point, performing the steps of:
    a) initializing a hardware graphics accelerator with a view point equal to the light sample point;
    b) using the hardware graphics accelerator, determining visibility, contour and surface coordinates of a visible surface of each object from the light sample point, the objects visible from the light sample point being the locally visible set for that light sample point; and
    c) generating an irradiance image for each object in the locally visible set, wherein an irradiance image corresponds to a lit view of the geometric model from the light sampling point;
  generating an irradiance texture for each object that is in at least one light sample point's locally visible set; and
  rendering the image of the objects in the set of objects with each object's coloring determined, at least in part, from the object's irradiance texture.

* * * * *

UNITED STATES PATENT AND TRADEMARK OFFICE
CERTIFICATE OF CORRECTION

PATENT NO.    : 6,359,618 B1
DATED         : March 19, 2002
INVENTOR(S)   : Alan Heirich It is certified that error appears in the above-identified patent and that said Letters Patent is hereby corrected as shown below:

Column 9,
Line 7, reads: "with their fall scope of equivalents."
It should read: -- with their full scope of equivalents. --.

Signed and Sealed this

Twenty-eighth Day of January, 2003

JAMES E. ROGAN
*Director of the United States Patent and Trademark Office*